United States Patent [19]
Tanaka et al.

[11] Patent Number: 5,539,909
[45] Date of Patent: Jul. 23, 1996

[54] NEGOTIATION METHOD FOR CALLING PROCEDURES LOCATED WITHIN OTHER OBJECTS WITHOUT KNOWLEDGE OF THEIR CALLING SYNTAX

[75] Inventors: Tetsuo Tanaka, Sagamihara; Hiroshi Tomita, Yokohama; Yasutaka Yamaguchi, Yokohama, all of Japan

[73] Assignee: Hitachi, Ltd., Tokoyo, Japan

[21] Appl. No.: 444,385

[22] Filed: May 19, 1995

Related U.S. Application Data

[63] Continuation of Ser. No. 45,906, Apr. 12, 1993, abandoned.

[30] Foreign Application Priority Data

Apr. 15, 1992 [JP] Japan ..................................... 4-095147

[51] Int. Cl.[6] ..................................................... G06F 9/40
[52] U.S. Cl. ..................................... 395/700; 364/DIG. 1; 364/280; 364/284; 364/284.3
[58] Field of Search ....................................... 395/650, 700

[56] References Cited

U.S. PATENT DOCUMENTS

| | | | |
|---|---|---|---|
| 5,187,787 | 2/1993 | Skeen et al. | 395/600 |
| 5,218,699 | 6/1993 | Brandle et al. | 395/650 |
| 5,261,080 | 11/1993 | Khoyi et al. | 395/500 |
| 5,280,610 | 1/1994 | Travis, Jr. et al. | 395/600 |
| 5,421,016 | 5/1995 | Conner et al. | 395/700 |

OTHER PUBLICATIONS

Showman, Peter S. "An Object–Based User Interface for the HP NewWave Environment," Hewlett–Packard Journal, Aug. 1989, pp. 9–17. (English).
Nikkei Computer, Dec. 16, 1991, pp. 81–93. (Japanese).
Rymer, John R., "Common Object Request Broker:OMG's New Standard For Distributed Object Management", Patricia Seybold's Network Monitor, Sep. 1991 v 6 n 9 p. 3(25).
Rymer, John R., "Hyperdesk DOMS:a Dynamic Distributed Object Management and Applications Development System", Patricia Seybold's Network Monitor, Feb. 1992 v 7 n 2 p. 3(19).

*Primary Examiner*—Kevin A. Kriess
*Attorney, Agent, or Firm*—Fay, Sharpe, Beall, Fagan, Minnich & McKee

[57] ABSTRACT

In a system allowing an application program (client) to call a procedure of another application program (server), when the client requests the server to supply a procedure call syntax, the server writes the procedure call syntax in a link management table. Thereafter, when the client searches the procedure call syntax from the link management table and calls the procedure, the server executes the procedure. Upon request of the procedure call, the server writes the procedure name and argument list specific to the server in the link management record. It is therefore unnecessary to consider the procedure call method when the client makes application programs.

15 Claims, 12 Drawing Sheets

611 — MESSAGE SENDING (SERVER id PROCEDURE NAME ARGUMENT LIST)
RETURN RESULT PROCEDURE EXECUTION RESULT

612 — MESSAGE RECEIVING ( )
RETURN RESULT OBJECT id, PROCEDURE NAME, ARGUMENT LIST

613 — RECEPTION PREPARATION
RETURN RESULT YES FOR PREPARED, NO FOR NOT PREPARED

614 — MESSAGE RETURN (OBJECT id, PROCEDURE EXECUTION RESULT)
RETURN RESULT NONE

FIG. 6B

621 — OBJECT LINK (CLIENT id, SERVER id)
RETURN RESULT LINK id

622 — LINK RELEASE (LINK id)
RETURN RESULT NONE

FIG. 6C

623 — PROCEDURE NAME SETTING (LINK id, PROCEDURE NAME)
RETURN RESULT NONE

624 — CLIENT SIDE ARGUMENT SETTING (LINK id, ARGUMENT LIST)
RETURN RESULT NONE

625 — SERVER SIDE ARGUMENT SETTING (LINK id, ARGUMENT LIST)
RETURN RESULT NONE

FIG. 6D

626 — CLIENT REFERENCE (LINK id)
RETURN RESULT CLIENT OBJECT id

627 — SERVER REFERENCE (LINK id)
RETURN RESULT SERVER OBJECT id

628 — PROCEDURE NAME REFERENCE (LINK id)
RETURN RESULT PROCEDURE NAME

629 — CLIENT SIDE ARGUMENT REFERENCE (LINK id)
RETURN RESULT CLIENT SIDE ARGUMENT LIST

640 — SERVER SIDE ARGUMENT REFERENCE (LINK id)
RETURN RESULT SERVER SIDE ARGUMENT LIST

FIG. 6E

641 — LINK id SETTING (LINK NAME, LINK id)
RETERN RESULT NONE

642 — LINK id REFERENCE (LINK NAME)
RETURN RESULT LINK id

FIG. 6F

631 — PROCEDURE SEARCH (PROCEDURE NAME)
RETURN RESULT POINTER TO PROCEDURE

NEGOTIATION METHOD FOR CALLING PROCEDURES LOCATED WITHIN OTHER OBJECTS WITHOUT KNOWLEDGE OF THEIR CALLING SYNTAX

This is a continuation of U.S. application Ser. No. 08/045,906 filed Apr. 12, 1993, now abandoned.

BACKGROUND OF THE INVENTION

The present invention relates to an application programs cooperation method for supporting one application program to use a procedure defined by another application program.

While writing a text by a word processor, the user has often a need to merge a graphics image generated by graphics software or a chart or graph generated by spreadsheet software into the text. To merge a graphics image, chart, or graph, the word processor checks the format of data processed by the graphics software or spreadsheet software, or runs the graphics application program or spreadsheet application program to make the program merge the graphics image, chart, or graph into the text.

Attention has been paid to a technique of integrally managing combinations of data and application programs to facilitate cooperation between application programs, i.e., to facilitate a procedure call from one application program to another application program. For example, in NewWave described in 1989 HEWLETT-PACKARD JOURNAL 9, PP. 9–17 by Peter S. Showman, an application program and data to be processed by the program are integrally managed and called an object. Which application program is to be selected for given data is managed by using objects, so that a proper application program is automatically selected only by designating data to be used. A message is also exchanged for the communication between objects. A caller object can know from the message, procedures supported by the callee object, and can request the callee object to execute the supported procedure. Each message is a combination of characters and symbols used for the information transfer between objects, and includes a command, its response, and the like.

In NewWave with objects being interconnected by links, a chart, graph, or the like generated by spreadsheet software can be synthesized with a text generated by a word processor. In this case, a caller object displays callee data not by using a caller application program but by simply instructing the callee object to supply and display the data at a designated display area. The callee object is therefore responsible for displaying its own data at the designated area of the caller object.

CORBA addressed in NIKKEI COMPUTER, 16/12/1991, pp. 81–93, provides an application program support system wherein a plurality of objects under distributed environment are cooperated each other by exchanging a message. An object request broker (ORB) as the nuclei of CORBA receives a message from a caller object and sends it to a proper callee object. ORB then receives the result processed at the callee object, and returns it to the caller object. In this manner, a procedure of an object at another computer can be called.

The above-cited related techniques have the following problems.

In calling a procedure supported by an application program from another application program by sending a message to the object which supports the procedure, it is necessary for the caller object (hereinafter called a client) to know the name and call arguments of the procedure supported by the callee object (hereinafter called a server).

If a procedure call method, the number, type, or order of arguments is changed at a server, or if a new server is provided and has a different argument list, application programs at clients are required to be updated.

In the case that an argument of a procedure is changed because of editing data at the server, it is necessary to notify clients of such a change to allow them to change the argument. For example, in a procedure which provides a display of part of data of the object by using an argument indicative of the display range, if the server changes the data, clients are required to change the display range argument.

In NewWave providing a function to interconnect objects by links, each link represents a containment relationship between caller and callee objects for the display of the callee object within the display area of the caller object. However, even if a server has a procedure other than a display procedure, such as a moving image procedure including playback, stop, slow playback, and rapid feed, clients cannot select and execute such a procedure.

SUMMARY OF THE INVENTION

It is an object of the present invention to provide an application programs cooperation method capable of executing a variety of procedures including a display procedure serviced by a server, without writing the program codes representing procedure names and argument lists in application programs of each client. It is another object of the present invention to provide an application programs cooperation method as above, capable of dealing with a change at a server without any program change at each client. A change at a server includes a procedure change, an argument change for a procedure call, and an addition of a new server application program.

In order to achieve the above objects, the present invention provides a function of establishing a link between a client object and a server object, and a function of writing a procedure name and argument list necessary for calling the procedure of a server object, with respect to the established link. The phrase "establishing a link" means generating information necessary for interconnecting a client object and server object together. The write function is available not only by the linked object but also by other objects when executing an application program. Without directly designating the procedure name and arguments at the client, the procedure can be executed by designating only a link identifier so that the procedure and arguments are dynamically searched. Namely, the link designated by the identifier is referred to, and the procedure name and arguments written for the link are sent to the server object in the form of a message to execute the procedure.

To accomplish the link establishing function, a function of storing the procedure name and arguments for the link, and a function of searching the procedure name and arguments and calling the procedure, a link management table is provided. The link management table has a plurality of link management records in each of which the information for the accomplishment of such functions is stored, the information including a link identifier (link ID), client object, server object, procedure name, and argument list necessary for the procedure call. The link management table can be referred to or updated by each of a plurality of objects. In order that the client can search the link management record, the client holds sets of link identifiers and their names distinguishable by the client. In order that the server can execute the procedure, the server holds sets of procedure names and pointers to the procedures. The procedure is executed when a message with the procedure name is sent from the client. The client establishes a link to a server, and requests the server to write the procedure call syntax in the link management record. At the same time, the client gives a name of the link identifier distinguishable by the client. The server writes the procedure name and arguments necessary for the procedure execution into the link management record represented by the link identifier sent from the client. In calling the server procedure, the client searches the link management record in the link management table in accordance with the name of the link identifier, and sends the procedure name and argument list written in the link management record to the server in the form of message. The server executes the procedure having the procedure name written in the message.

Sending the message representing the information searched from the link management table may be performed by the client. Alternatively, a link management program may be provided for managing the information related to links. In this case, the client sends a "call" message containing the link identifier to the link management program. In response to the "call" message, the link management program sends a message containing the information related to the link to the server. Message transfer between objects and the procedure execution corresponding to the message may be performed using the above-described NewWave or CORBA technique, or a remote procedural call technique described in the prior document NIKKEI COMPUTER, 16/12/1991, pp. 81–93. In the case that the above-described message transfer and the procedure execution facility (NewWave, CORBA, or remote procedure call technique) is not provided, each time a message is to be sent. The client may start up server application program with an option. The server executes the procedure corresponding to the option.

According to the present invention, a link is established between a client object and a server object, and not only the client object that establishes link but also the server linked object can write the procedure name and argument list necessary for the procedure call in link management records, when executing application programs. In this manner, the procedure name and arguments necessary for the procedure call can be dynamically designated by the server when executing the application program.

According to the present invention, the procedure can be called by designating only the link identifier, without entering the caller object name, procedure name, and arguments to be contained in a message into a client application program. Namely, without entering programmed codes representing the procedure name and argument list into a client application program, the client can select and execute various procedures such as a display procedure supplied by servers, and deal with a change on the server side without changing client application programs.

DESCRIPTION OF THE PREFERRED EMBODIMENTS

Figure 1:
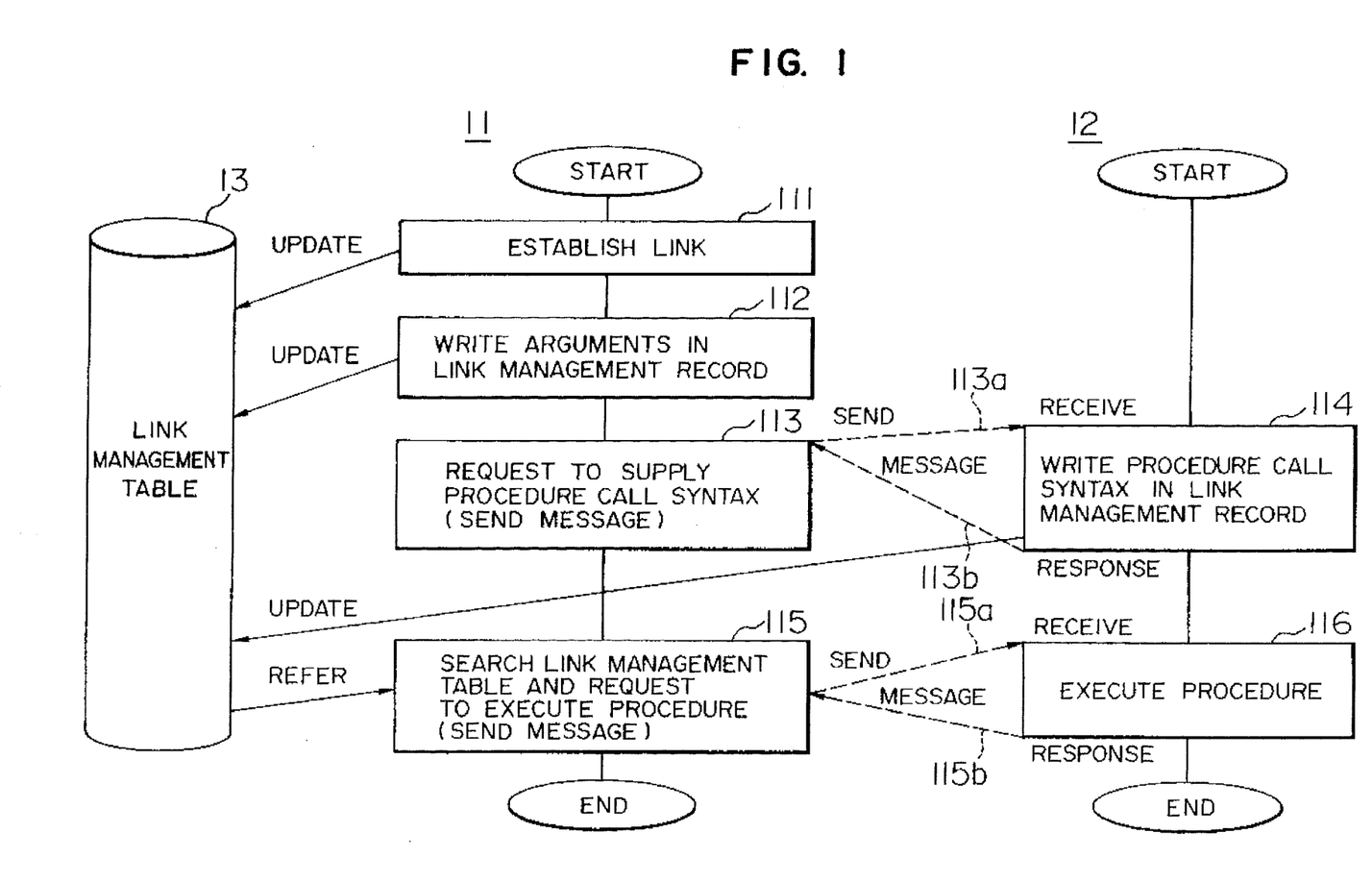
FIG. 1 shows an example of a process sequence to be executed by a server and client when a client object uses a procedure defined by a server object.
Figure 2A:
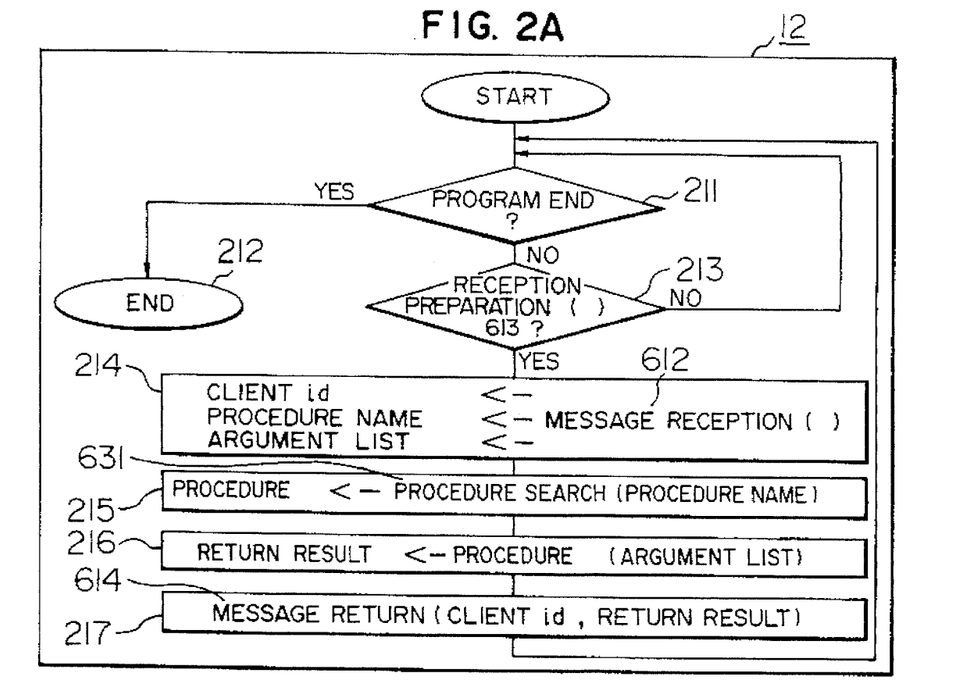
FIGS. 2A and 2B are flow charts showing the details of the server process sequence shown in FIG. 1.
Figure 2B:
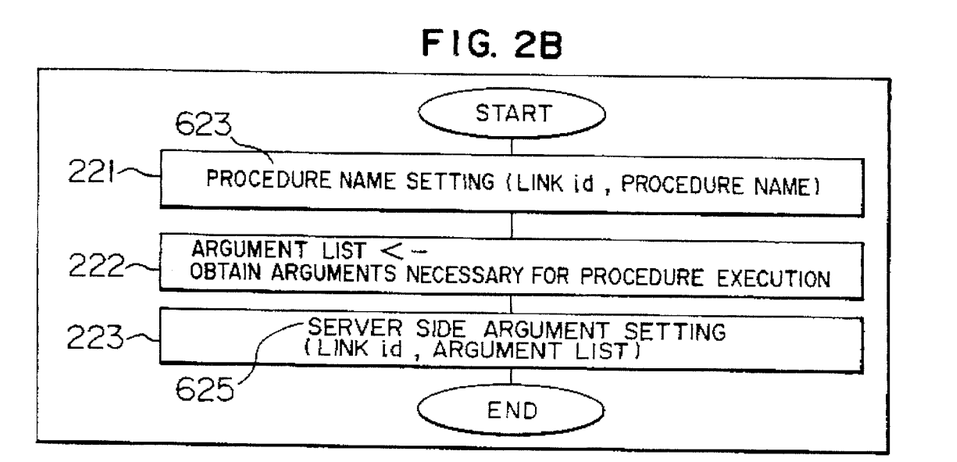
Figure 3A:
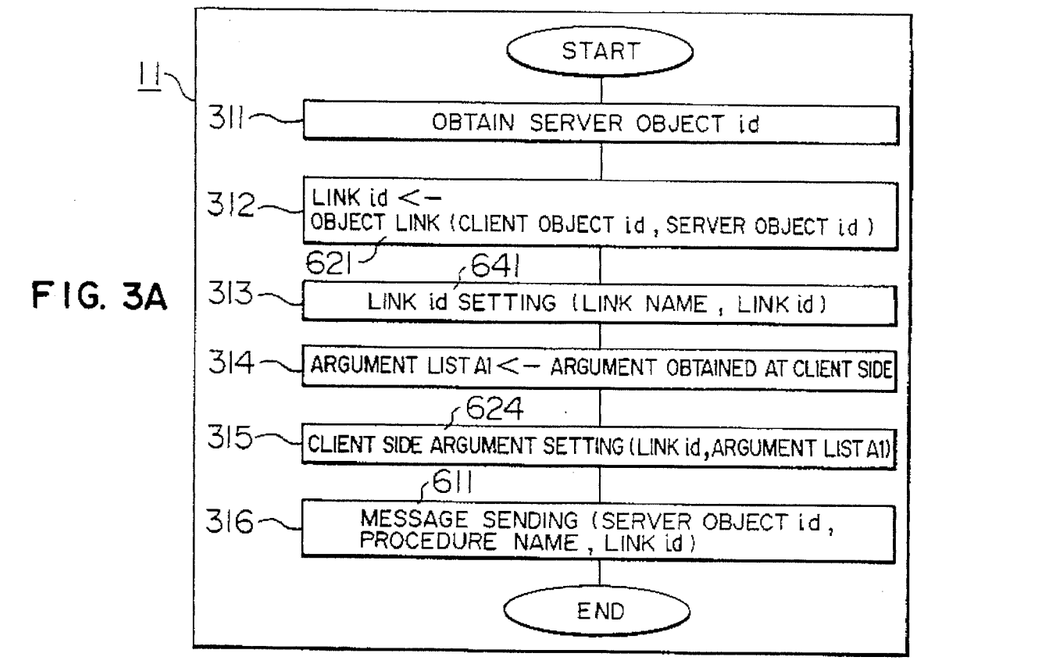
FIGS. 3A and 3B are flow charts showing the details of the client process sequence shown in FIG. 1.
Figure 3B:
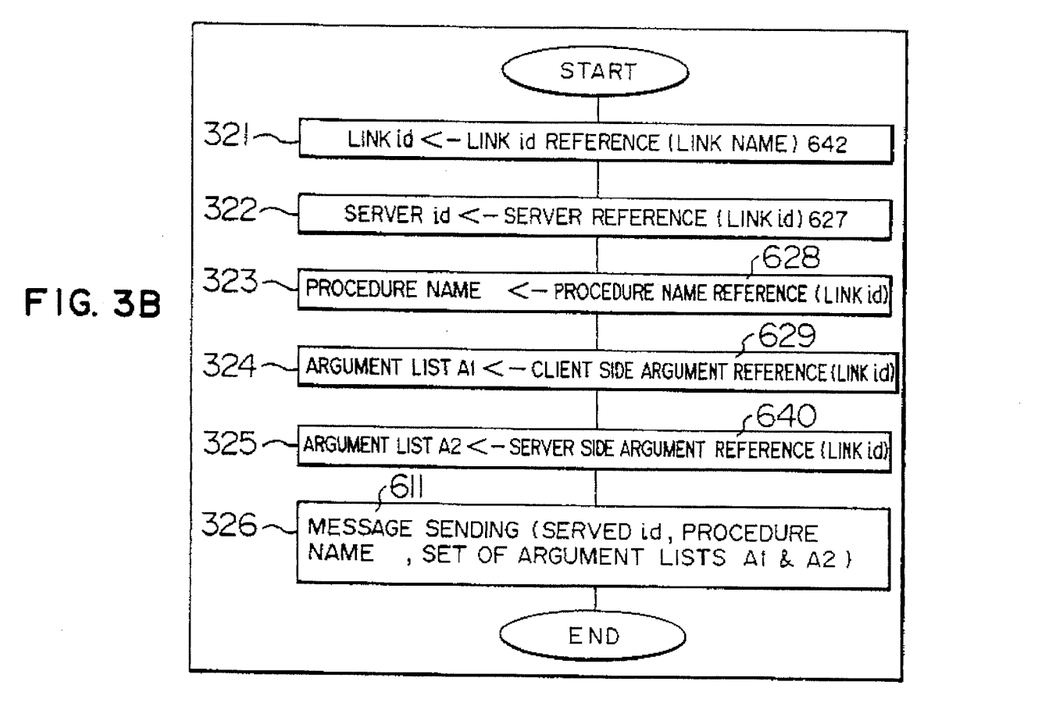
Figure 4:
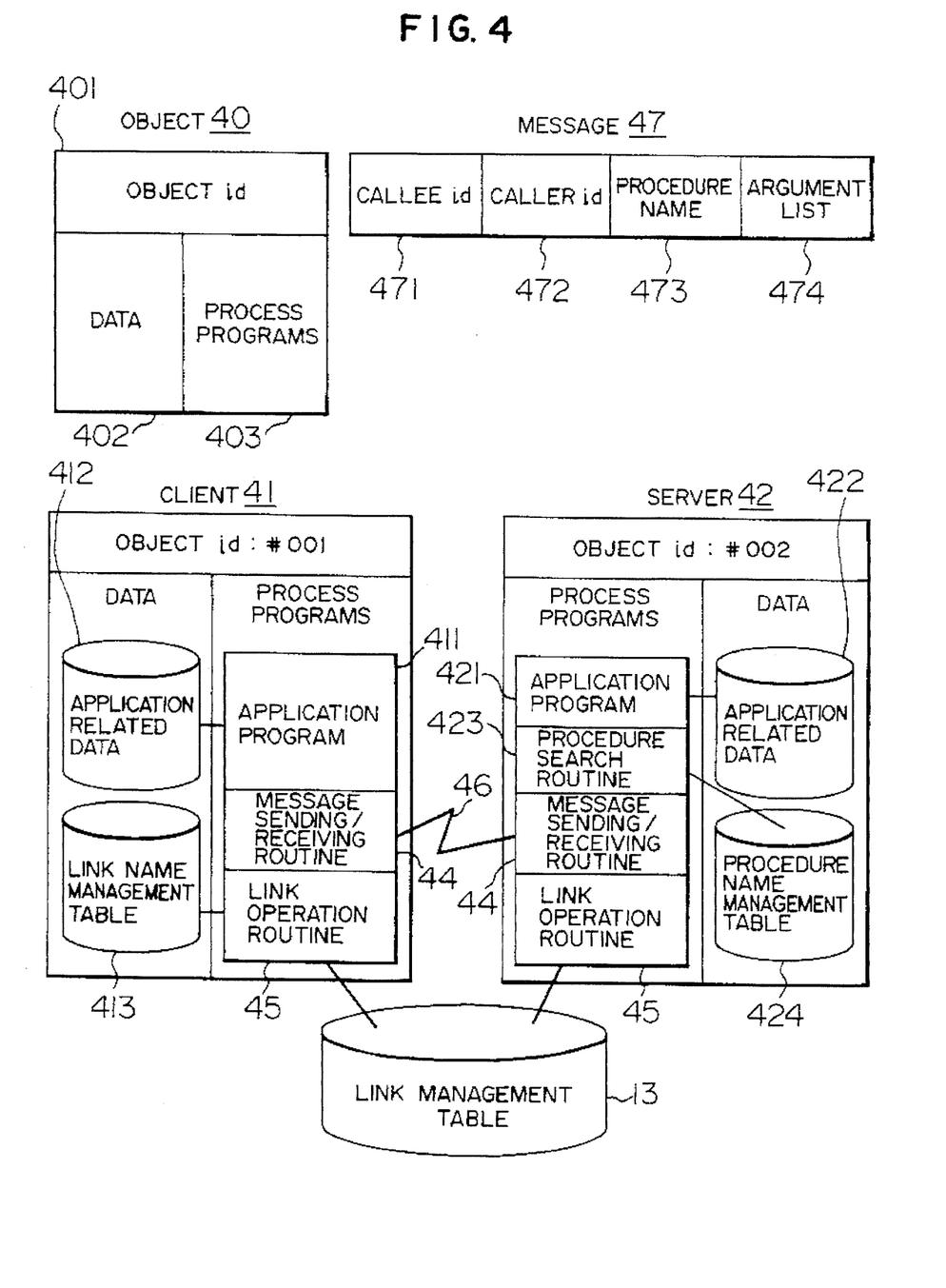
FIG. 4 illustrates examples of an object structure, message structure, and the software configuration of a system in which an operation is performed while calling a procedure from one application to another application.
Figure 5:
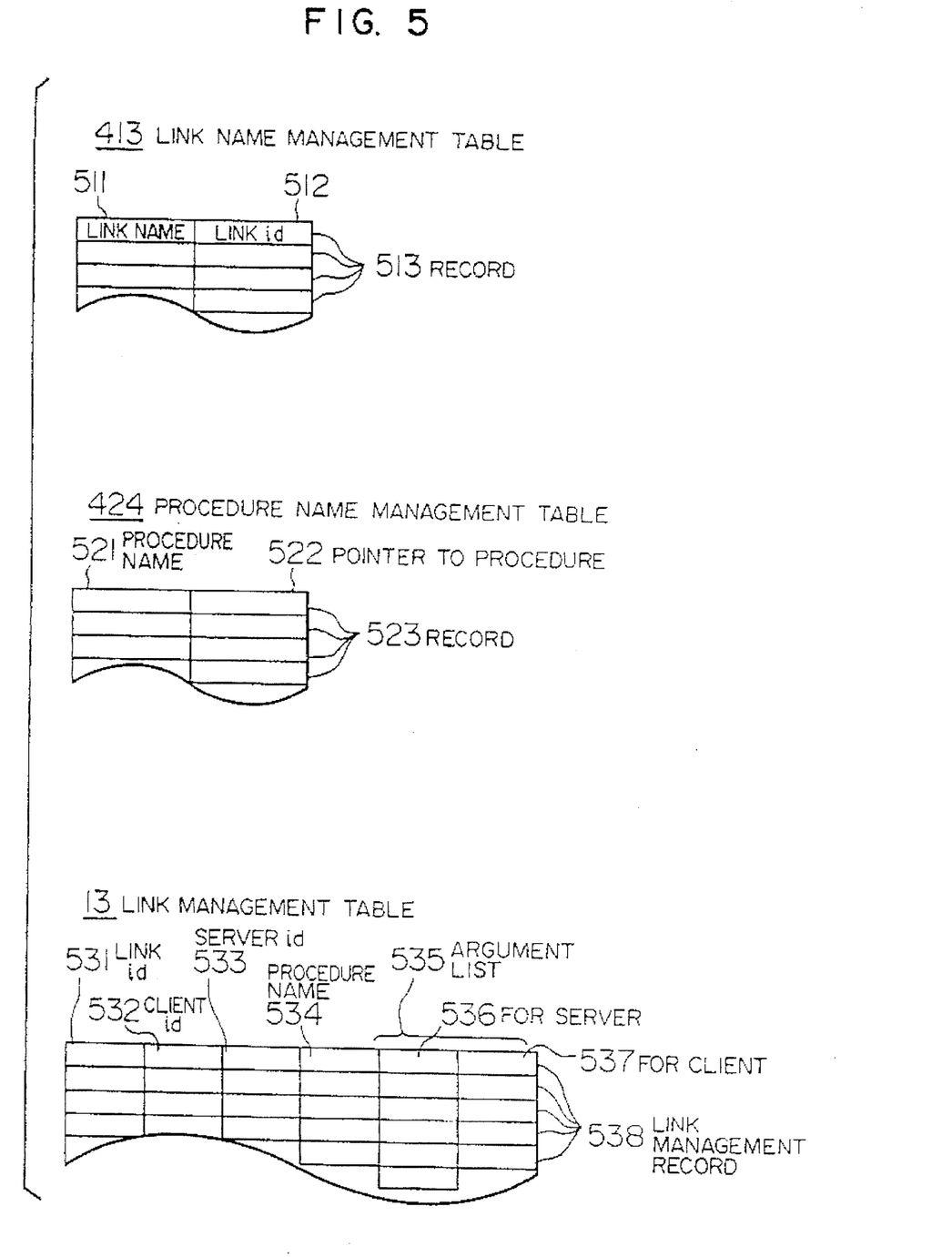
FIG. 5 shows the details of examples of the tables 413, 424, and 13 shown in FIG. 4.

FIG. 1 shows an example of a process sequence to be executed by a server and client when a client object uses a procedure defined by a server object. FIGS. 2A and 2B are flow charts illustrating the details of the server process sequence 12 shown in FIG. 1. FIGS. 3A and 3B are flow charts illustrating the details of the client process sequence 11 shown in FIG. 1. FIG. 4 illustrates examples of an object structure, message structure, and the software configuration of a system in which an operation is performed while calling a procedure from one application to another application. FIG. 5 shows the details of examples of the tables 413, 424, and 13 shown in FIG. 4. FIGS. 6A, 6B, 6C, 6D, 6E, and 6F are lists explaining the functions of the routines 44, 45, and 423 shown in FIG. 4.

A link management table 13 shown in FIG. 1 stores a plurality of link management records which are updated or referred to by the client process sequence 11 and server process sequence 12. Each link management record includes a link identifier, a server identifier, a client identifier, a procedure name, and an argument list.

An object 40 shown in FIG. 4 includes, for example, an object identifier (ID) 401 for identifying the object, data 402, and a program 403 for processing the data 402. The object identifier is an identifier specific to each object. There is no objects having the same object identifier. A message 47 includes a target object identifier 471, a principal object identifier 472, a procedure name 473, and an argument list 474.

The software configuration of the system shown in FIG. 4 includes, for example, a client 41, a server 42, a link management table 13, and a message communication line 46 over which a message 47 is transferred between the client 41 and server 42. The message 47 can be sent and received by using the same technique used by NewWave, CORBA, or the like. A plurality of clients 41 and servers 42 are present in one system. Each object may be the client 41 for a procedure or the server 42 for another procedure.

The client 41 includes an application program 411 performing a specific procedure, data 412 specific to the application program 411, a message sending/receiving routine 44 for the transfer of the message 47 to the server 42, a link operation routine 45 for performing an operation on a link, and a link name management table 413 for storing pairs of link names and link identifiers. The server 42 includes an application program 421 performing a specific procedure, data 422 specific to the application program 421, a message sending/receiving routine 44 for the transfer of the message 47 to the client 41, a link operation routine 45 for performing an operation on a link, a procedure name management table 424 for storing pairs of procedure names and pointers indicating the procedures, and a procedure search routine 423 for searching a pointer indicating a procedure by sending a procedure name.

FIG. 5 shows the details of the link name management table 413 and procedure name management table 424 shown in FIG. 4, and the link management table 13 shown in FIG. 1. As shown in FIG. 5, the link name management table 413 has a plurality row of records 513 each constituted by a link name 511 and an link identifier 512. The link identifier 512 is an identifier specific to each link, and there are no links having the same link identifier. The procedure name management table 424 has a plurality row of records 523 each constituted by a procedure name 521 and a pointer 522 to the procedure. The link management table 13 has a plurality row of link management records 538 each constituted by a link identifier 531, a client object identifier 532, a server object identifier 533, a procedure name 534, and an argument list 535 used for calling the procedure. The argument list 535 is constituted by a pair of an argument list 536 written by the client and an argument list 537 written by the server.

FIGS. 6A, 6B, 6C, 6D, 6E, and 6F are lists explaining the functions of the message sending/receiving routine 44, link operation routine 45, and procedure search routine 423. Each function is stated in the format of a function name (argument) and a return result.

Figure 6A:
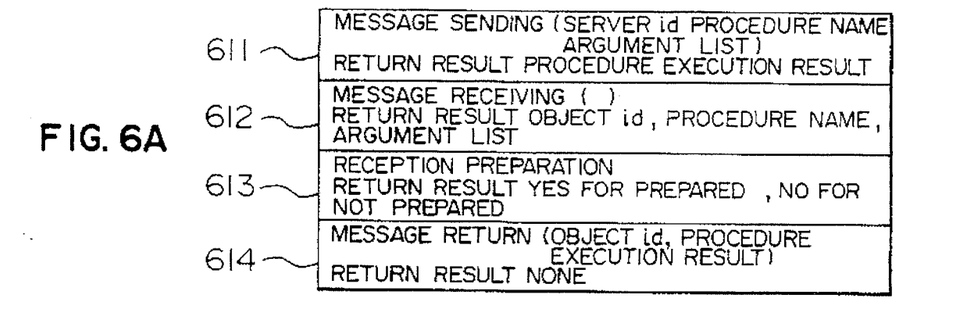
FIGS. 6A, 6B, 6C, 6D, 6E, and 6F are lists explaining the functions of the routines 44, 45, and 423 shown in FIG. 4.

FIG. 6A illustrates the functions supplied by the message sending/receiving routine 44. A message sending function 611 generates a message 47 from the server object identifier, client object identifier, procedure name, and argument list, sends the message 47 to the object identified by the server identifier, and outputs the procedure execution result as the return result. A message receiving function 612 receives a message 47, and outputs, as the return result, the client object identifier, procedure name, and argument list. A reception permission function 613 outputs information representing whether the message is prepared to receive. A message return function 614 sets, as the return result for the message sending function, the data designated by its argument "return result". Namely, when the client executes the message sending function 611 and if the reception preparation function 613 indicates a reception preparation, the server receives the message from the client by executing the message receiving function 612. When the server executes the message return function 614, the execution of the message sending function 611 is terminated at the client. The client obtains, as the return result for the message sending function 611, the data designated by the message return function 614 argument "return result".

Figure 6B:
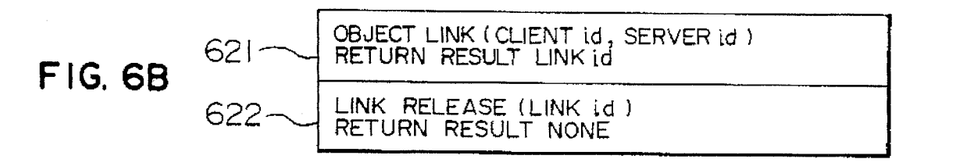
Figure 6C:
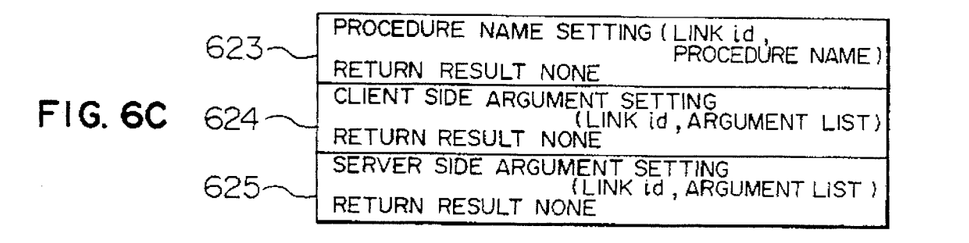

FIG. 6B illustrates the functions to be used for generating or deleting a link management record 538 of the link management table 13. An object link function 621 generates a new link management record 538, writes a new link identifier in the link management record 538 at its link identifier field 531 and the client and server object identifiers at its client and server object identifier fields 532 and 533, and outputs the link identifier written in the link identifier field as the return result. A link release function 622 deletes the link management record 538 designated by the link identifier. FIG. 6C illustrates the functions to be used for setting the values to the fields of each link management record 538. A procedure name setting function 623 writes a designated procedure name in the procedure name field of the link management record 538 designated by the link identifier. A client side argument setting function 624 and server side argument setting function 625 writes argument lists in the client and server lists 536 and 537 of the argument list 535 of the link management record 538 designated by the link identifier.

Figure 6D:
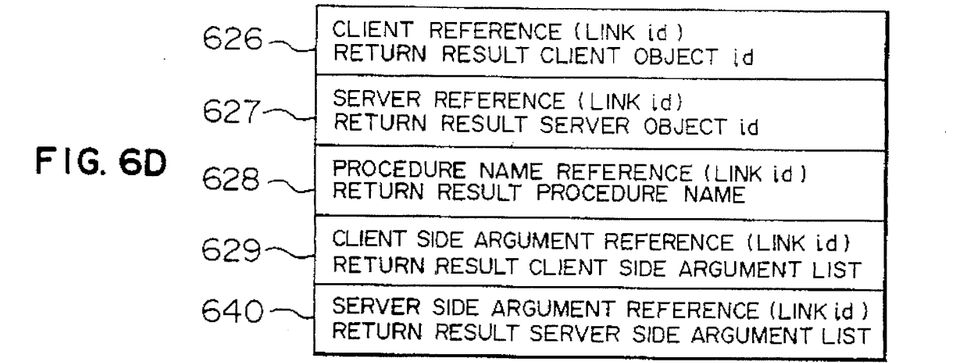

The functions 626, 627, 628, 629, and 640 illustrated in FIG. 6D output the client identifier 532, server identifier 533, procedure name 534, client side argument list 536, and server side argument list 537, respectively, written in the link management record 538 designated by the link identifier.

Figure 6E:
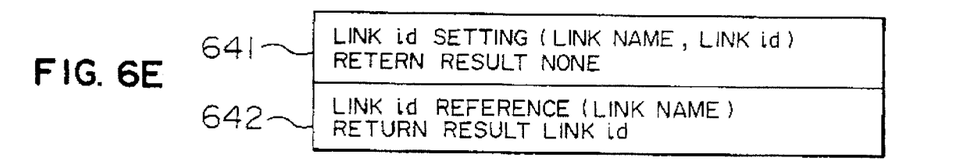

The functions illustrated in FIG. 6E are for the control of the link name management table 413. A link identifier setting function 641 generates a new record 513 of the link name management table 413, and writes the link name and link identifier in the record 513 at the link name field 511 and link identifier field 512. A link identifier reference function 642 searches the record 513 having the designated link name from the link name management table, and outputs the link identifier written in the record.

Figure 6F:
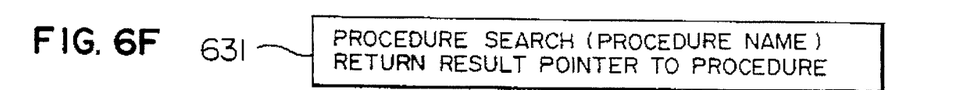

A procedure search function 631 illustrated in FIG. 6F searches the record 523 having the designated procedure name 521 from the procedure name management table 424. The procedure name management table 424 is made by a programmer of the application program 421.

Next, the process sequence to be executed by the server and client will be described with reference to FIG. 1, for the case that an application program at the client uses a procedure defined by an application program at the server. There is a procedure 114 that supply procedure call syntax (the name and arguments of a procedure 116), corresponding to the each procedure 116.

First, the client establishes a link to the server to be connected (Step 111). Namely, the client identifier and server identifier are written in the link management table 13 to obtain the link identifier. Next, the client writes the arguments only those obtainable at the client side in the link management record (Step 112). Then, the client sends a message 113a to the server to request the server to supply the procedure call method and arguments to the link management record of the link (Step 113). Upon reception of the message 113a, the server writes the procedure name and arguments in the link management record, and returns a message 113b (Step 114). Namely, the server writes the procedure call syntax and necessary arguments in the link management record of the link management table 13. When the client requests the server to execute the procedure, the client searches the link management record supplied with the procedure call syntax and arguments from the link management table 13, and sends the contents of the record to the server as a message 115a (Step 115). Upon reception of the message 115a, the server executes the procedure having its name written in the received message, and returns the execution result 115b to the client (Step 116).

Next, the process sequence 12 at the server will be described in detail with reference to FIG. 2.

FIG. 2A is a flow chart illustrating the sequence of processing a message received from the client. This flow chart shows the details of Steps 114 and 116 shown in FIG. 1, in which in response to the message indicating the procedure call method and arguments searched from the link management table 13, the server executes the procedure. FIG. 2B is a flow chart showing the details of Step 116 shown in FIG. 1, for the case that the procedure name contained in the received message corresponds to a procedure requesting to update the link management record.

The process sequence at the server to be executed when receiving a message from the client will be described in detail with reference to FIG. 2A.

It is first checked whether the server should be terminated or not (Step 211). The decision of termination depends on a kind of the received message recently. If to be terminated, the server side process is not serviced (Step 212). If not to be terminated, the server uses the function 613 of the message sending/receiving routine 44 to check whether the message is prepared to receive (Step 213). If not prepared, the process returns to Step 211. If prepared, the server receives the message by using the function 612 of the message sending/receiving routine 44, to obtain the client object identifier, procedure name, and argument list (Step 214). Next, the server searches the procedure name management table 424 by using the function 631 of the procedure search routine 423 to obtain the procedure pointer 522 to the procedure having the procedure name 521 (Step 215). Then, the server executes the procedure (Step 216), and returns the execution result to the client by using the function 614 of the message sending/receiving routine 44 (Step 217), to thereafter return to Step 211.

Next, referring to FIG. 2B, the detailed description will be given for the process to be executed when the procedure name contained in the received message corresponds to a process requesting to update the link management record. The flow chart shown in FIG. 2B illustrates the details of a particular case at Step 216 shown in FIG. 2A. As shown in Step 316 of FIG. 3A to be later described, the argument list of the message requesting to update the link management table necessarily contains the link identifier.

First, the server executes the function 623 of the link operation routine 45 to set the name of the procedure with respect to which the link management record is to be updated, to the link designated by the client (Step 221). Then, the arguments necessary for the execution of the procedure are obtained through calculation of the data 422 specific to the application program or through user input from the application program (Step 222). Thereafter, the obtained argument list is set to the link by using the function 625 of the link operation routine 45 (Step 223) to thereafter terminate this process. The link identifier at Step 221 is contained in the argument list which is one of the return result of the message received at Step 214, as described above. The procedure name P at Step 221 is determined by the programmer of the application program for each procedure requesting to update the link management table 13.

Next, the process sequence at the client will be described in detail with reference to FIGS. 3A and 3B.

FIG. 3A is a flow chart showing the details of Steps 111, 112, and 113 shown in FIG. 1, in which the client requests the server to register the procedure call syntax. FIG. 3B shows the details of Step 115 shown in FIG. 1.

The process sequence that the client requests the server to register the procedure call syntax, will be described in detail with reference to FIG. 3A.

First, the client obtains the server object identifier, for example, by a user input from an application program (Step 311). Next, the client establishes a link by using the function 621 of the link operation routine 45, with the server object identifier and client object identifier being designated (Step 312), and registers a set of the link name and link identifier in the link name management table 413 by using the function 641 of the link operation routine 45 (Step 313). This link name is used for obtaining the link identifier when calling the procedure. Next, the client obtains the arguments those obtainable at the client, for example, through a user input from the application program (Step 314), and registers the link identifier and client side arguments in the link management table 13 by using the function 624 of the link operation routine 45 (Step 315). Next, the client executes the function 611 of the message sending/receiving routine 44 by designating the server object identifier, procedure name, and link identifier (Step 316).

Next, Step 115 shown in FIG. 1 will be described in detail with reference to FIG. 3B.

First, the client obtains the link identifier from the link name management table 413 by using the function 642 of the link operation routine 45 and the link name as a search key (Step 321). Next, using the functions 627, 628, 629, and 640 of the link operation routine 45, the client obtains the server object identifier, procedure name, client side argument list, and server side argument list (Steps 322 to 325). Then, the client executes the function 611 of the message sending/receiving routine 44 by designating the server identifier, the procedure name, and a set of two argument lists (Step 326).

According to the above-described embodiment, a argument list 474 of a message for calling a procedure 114 has only one element, link identifier, and arguments of a message for calling a procedure 116 to be written in the link management records on the client side are fixed parameters independent from the procedure. Therefore, in making the application program at the server, the procedure name and parameters can be freely changed without a necessity of changing application programs at clients. Furthermore, even if a new server procedure requires arguments different from those used previously, this new server procedure can be used without changing application programs at clients on the condition that the server satisfies the programming scheme described above.

Consider for example a chart generated by spreadsheet software is merged and displayed in a text generated by a word processor. In this case, the word processor object at the client is linked to the spreadsheet object at the server. Using the link identifier as an argument, a message is sent to the spreadsheet object to request it to write the display procedure name and arguments in the link management record. The spreadsheet object registers the display procedure name and display area in the link management table. The word processor object searches the table each time a chart is to be displayed, and sends a message containing the display procedure name and display area to the spreadsheet object. In the case that a graphics image generated by graphics software is requested to be merged and displayed in the text, the message is transferred between the word processor software and graphics software in the same manner as above. The only different point between both the cases is the contents to be registered in the link management table, but the process sequence of the word processor is the same for both the case. Namely, without changing any line of the application program of the word processor, the procedure supplied by the graphics software at the new server can be used.

In this embodiment, an integral combination of an application program and its data is processed as an object. The procedure call method described above is also applicable to calling an object or method of an object-oriented language.

(Second Embodiment)

Figure 7:
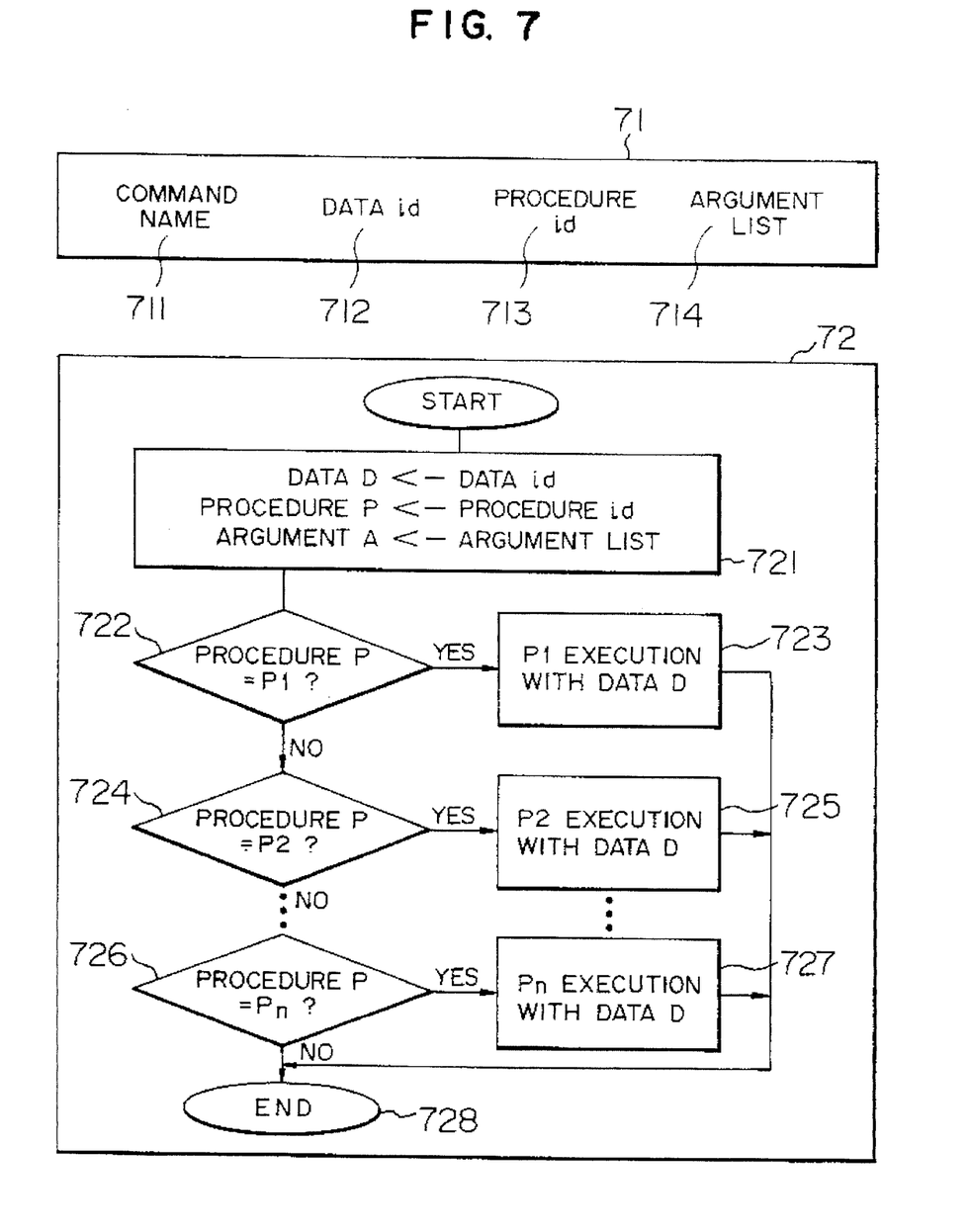
FIG. 7 shows the format of a start-up command for an application program at a server, and a flow chart illustrating the process sequence of the command.
Figure 8:
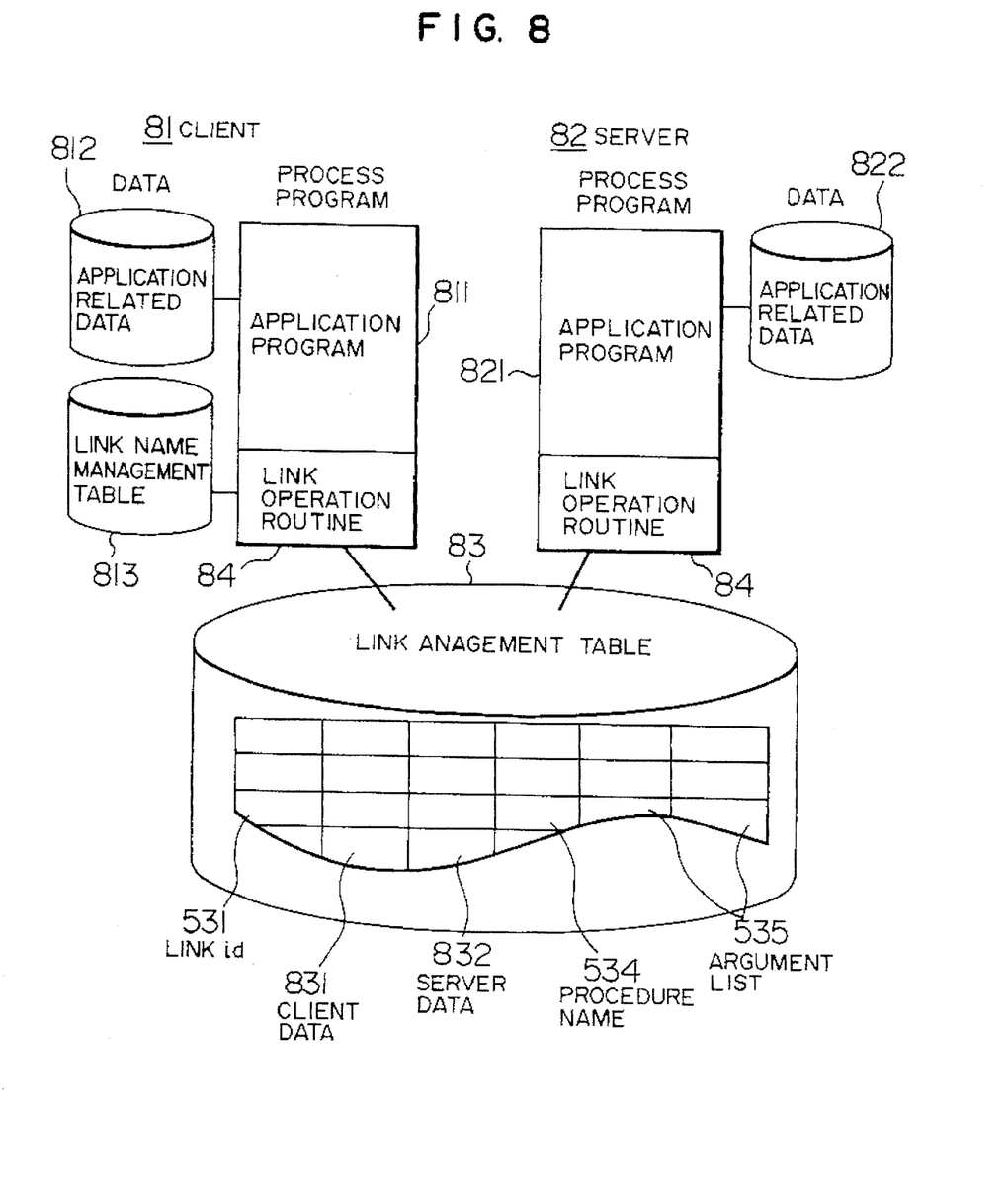
FIG. 8 shows an example of the software configuration of application programs at a server and client.

In the first embodiment, an integral combination of an application program and its data is managed as an object, and a message is transferred between objects to execute an objective procedure. The second embodiment which will be detailed with reference to FIGS. 7 and 8 provides an applications cooperation method without using the object management means and message sending/receiving means. Without using the object management means signifies that the application program 403 and data 402 shown in FIG. 4 are managed independently from each other and there is no object identifier 401. Without using the message sending/receiving means signifies that there is no message sending/receiving routine 44 shown in FIG. 4 and a message cannot be transferred directly between objects.

In the following, the calling side from which a procedure of another application program is called is referred to as a client, and the called side at which the procedure was called is referred to as a server.

FIG. 7 shows the format 71 of a start-up command for a server application program, and a flow chart 72 illustrating the process sequence of a server application program. FIG. 8 shows an example of the software configuration of the client and server.

The format 71 of a start-up command for a server application is constructed of a command name 711 to be used for activating the server, and its arguments. The arguments include a data identifier 712, procedure identifier 713, and procedure argument list 714. The data identifier 712 identifies the name of the file storing the data to be processed by the server application program. The flow chart 72 shown in FIG. 7 illustrates the process sequence to be executed by the server application program.

The client shown in FIG. 8 includes an application program 811 for executing a procedure specific to the client, data 812 specific to the application program, a link operation routine 84 for performing an operation on a link, and a link name management table 813 for storing pairs of link names and link identifiers. The server 82 includes an application program 821 for executing a procedure specific to the server, data 822 specific to the application program, and a link operation routine 84 for performing an operation on a link. The link management table 83 has the same structure as the table 13 shown in FIG. 5, and includes, in place of the client identifier 532 and server identifier 533, an identifier 831 for the data 812 (hereinafter called client data) specific to the client application program and an identifier 832 for the data 822 (hereinafter called server data) specific to the server application program. Similar to the first embodiment, in this second embodiment, there is provided the link operation routine 84 with which the link management table 83 is accessed for the control of links. This link operation routine 84 has the same functions as those shown in FIGS. 6B to 6E. Different from the first embodiment, however, the identifiers of the server data 822 and client data 812 are used as the server identifier and client identifier contained in the arguments or return results. The link name management table 813 has the same structure as the table 413 shown in FIG. 4.

Next, the process sequence to be executed by the server application program will be detailed with reference to FIG. 7, for the case the client application program uses the procedure defined by the server application program. There is a procedure Psup that supply procedure call syntax (the name and arguments of a procedure Pexe), corresponding to the each procedure Pexe. It is assumed that one of n procedures P1, P2, . . . , Pn of the server application program can be executed.

The server first analyzes the arguments contained in the start-up command to obtain the data identifier, procedure identifier, and argument list (Step 721). The server then compares the procedure identifier with P1 (Step 722). If both the procedures are the same, the procedure P1 is executed (Step 723). If not at Step 722, the procedure identifier is compared with P2 (Step 724). If both the procedures are the same, the procedure P2 is executed (Step 725). In this manner, the procedures P3 to Pn are checked and if there is no coincident procedure, the process at the server is terminated (Step 728). A process of updating the link management table 83 is contained in one of the procedures P1 to Pn, and this updating process is executed in the similar manner described with FIG. 2B. In the case of the updating process, the link identifier is contained in the argument list 714.

Next, the process sequence to be executed at the client will be described. This process sequence is generally the same as that illustrated in FIGS. 3A and 3B. However, in this embodiment, the message sending processes 316 and 326 shown in FIGS. 3A and 3B rely on the activation of the server side, and the server and client identifiers are replaced by the server and client data identifiers.

Specifically, in the process sequence wherein the client requests the server to register the procedure to be executed upon establishment of a link, the client first obtains the server data identifier, for example, by a user input from the application program (Step 311). Next, the client establishes a link by using the function of the link operation routine 84, with the client data identifier and server data identifier being designated (Step 312), and registers a set of the link name and link identifier in the link name management table 813 by using the function of the link operation routine 84 (Step 313). Next, the client obtains the arguments those obtainable at the client, for example, through a user input from the application program (Step 314), and registers the client side arguments in the link management table 83 by using the function 624 of the link operation routine 84 (Step 315). Next, the client activates the application program of the server 82 by designating the server data identifier, procedure name, and link identifier as the arguments (corresponding to Step 316), to thereafter terminate the process sequence.

In the process sequence to be executed by the client for requesting to execute the procedure Pexe of server, the client first obtains the link identifier from the link name management table 413 by using the function 642 of the link operation routine 84 and the link name as a search key (Step 321). Next, using the functions 627, 628, 629, and 640 of the link operation routine 84, the client obtains the server data identifier, procedure name of Pexe, client side argument list, and server side argument list (Steps 322 to 325). Then, the client activates the application program of the server 82 by designating the server data identifier, the procedure name of Pexe, and a set of two argument lists (corresponding to Step 326).

According to the second embodiment, the same effects as the first embodiment can be obtained without using the message sending/receiving means.

(Third Embodiment)

In the first embodiment, the link management table 13 is controlled directly by the server 42 and client 41. Instead, programs dedicated to the control of links and the link management table 13 may be provided. In the third embodiment, a link management object is introduced. The link management table 13 is collectively controlled by this link management object to and from which a message is transferred. This embodiment will be described with reference to FIG. 9.

Figure 9:
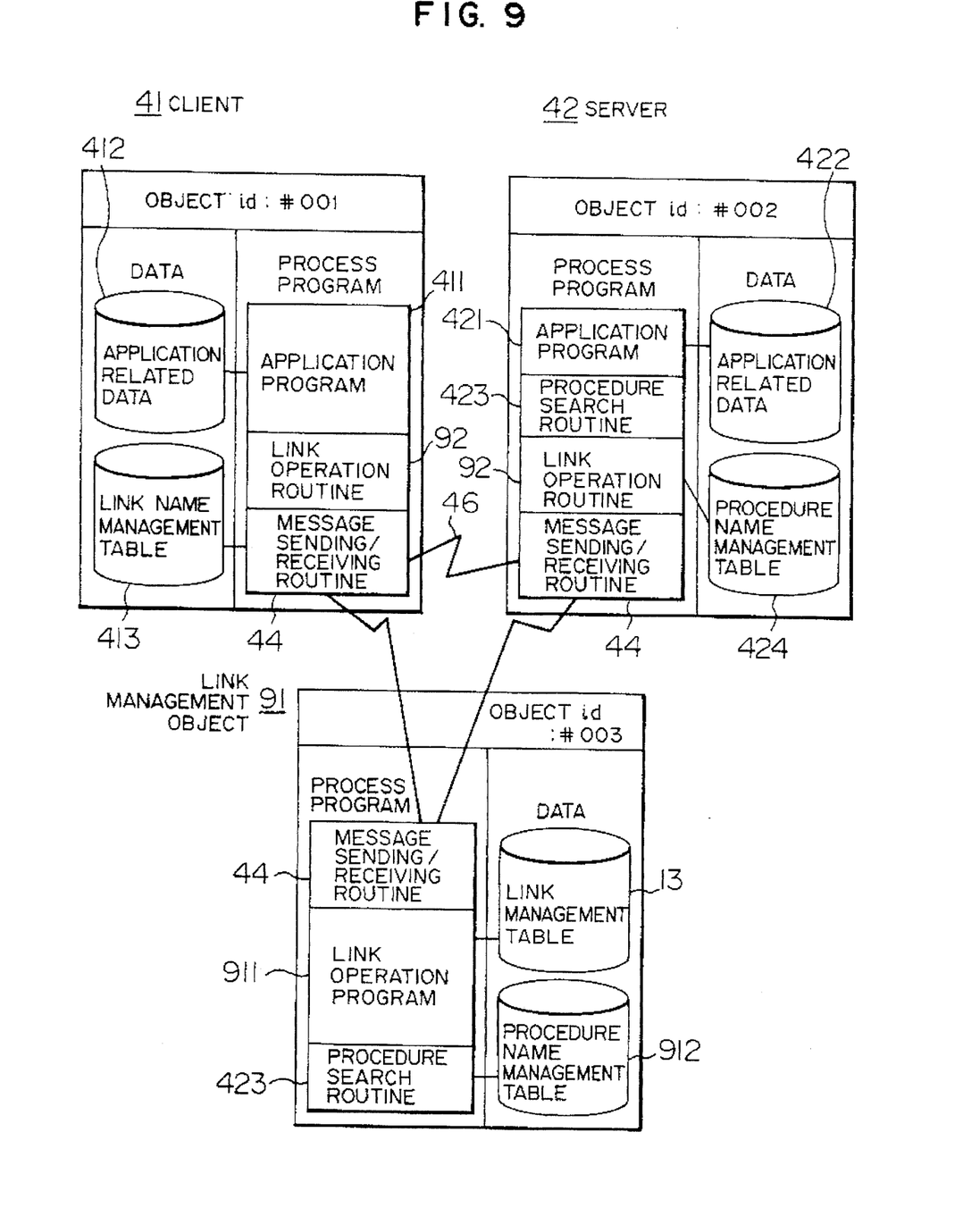
FIG. 9 shows an example of the software configuration of a system in which an operation is performed while calling a procedure from one application program to another application program using a link management object.

FIG. 9 shows an example of the software configuration of a system which allows an application program to use a procedure of another application program by using a link management object.

The client 41 and server 42 shown in FIG. 9 have the same configuration as those shown in FIG. 4, excepting that the functions of the link operation routine 92 are different from those described with FIG. 4. The link management object 91 controls the link management table 13, and operates as the server of both the client 41 and server 42. Namely, the link management object 91 receives a message from both the client 41 and server 42, controls the link management table 13, and sends the control result as the return result of the message.

The link management object 91 includes, similar to other objects, an object identifier, programs, and data. The data includes the link management table 13 and the procedure name management table 912. These tables have the same structure as those shown in FIG. 5. The programs include a message sending/receiving routine 44, link operation program 911, and procedure search routine 423. The contents of the routines 44 and 423 are the same as described with FIG. 4. The link operation program 911 performs the processes of updating and referring to the link management table, corresponding to the functions illustrated in FIGS. 6B to 6D, and performs the process of calling the procedure in accordance with the received message. This process sequence is the same as FIG. 2A.

The link operation routine 45 shown in FIG. 4 is a set of functions to control the link management table 13 and link name management table 413. The link operation routine 92 shown in FIG. 9 has a set of functions to send a message 47 to the link management object 91 via the message sending/receiving routine 44 and to request the execution of the functions 621 to 629, and 640 illustrated in FIGS. 6B to 6D, and a set of functions for the control of the link name management table 413. When each of the functions 621 to 629 and 640 of the link operation routine is called, a message including the procedure name and argument list is sent to the link management object 91, and the result obtained at the link management object is used as the return result of the function.

According to the third embodiment, all the processes necessary for the link management table are executed by the link management object. It is therefore unnecessary to consider the format of data to be written in the link management record, in making server and client programs. Furthermore, even if the data structure of the link management table is changed, only the link operation program is changed without a need of changing other client and server objects. In the third embodiment, a client sends messages for requesting the link management object 91 to execute functions 627, 628, 629, and sends message for requesting a server. Alternatively, link management object 91 may support a procedure "call" that executes functions 627, 728, 629, and sends message to the server. And the client sends only one message, "call" message for requesting to executes the function "call" with only one argument link id.

(Fourth Embodiment)

In the first embodiment, both the client and server write the information necessary for the server procedure call into the link management table. Instead, the server may send procedure call information to the client, as the return result of the message from the servant to the client. The client then manages the procedure call information. In the fourth embodiment, the procedure call information is stored on the client side. The procedure call process sequence using the procedure call information will be detailed with reference to FIGS. 9, 10, 11A, 11B, and 12.

Figure 10:
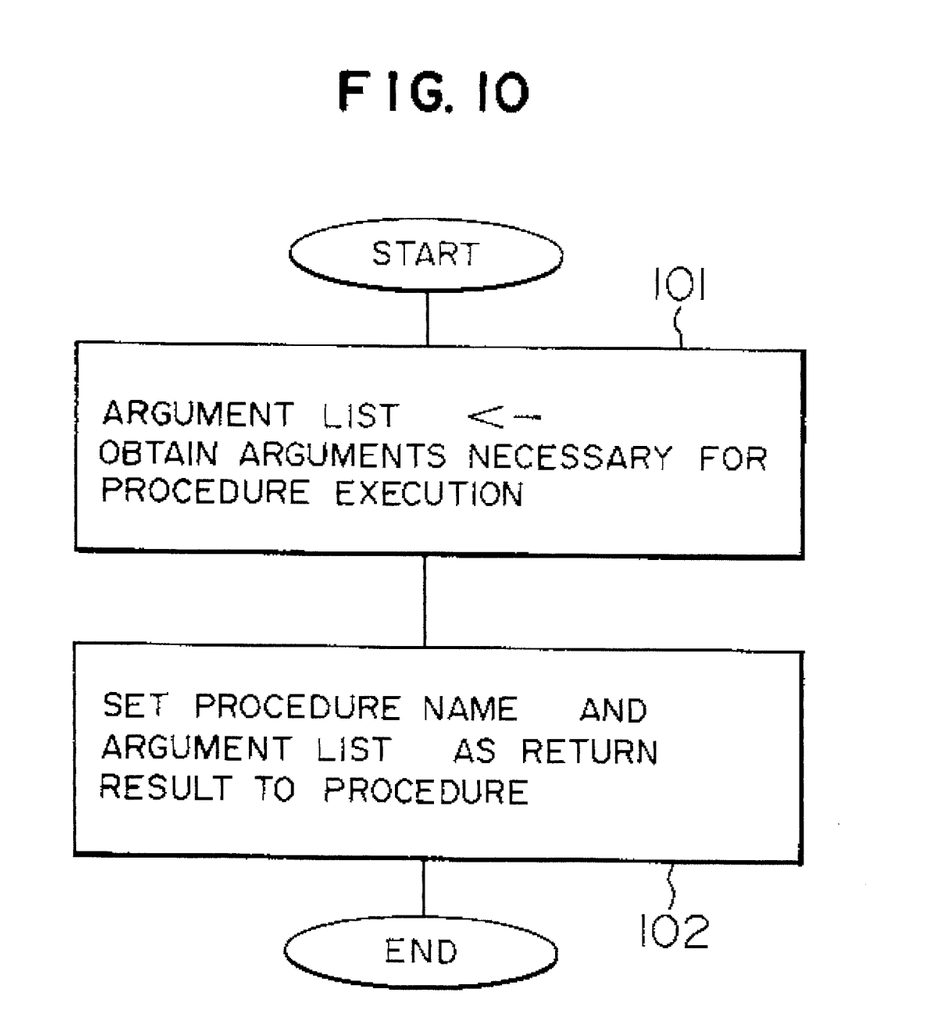
FIG. 10 is a flow chart illustrating the process sequence at a server for notifying a client of a procedure call sequence.
Figure 11A:
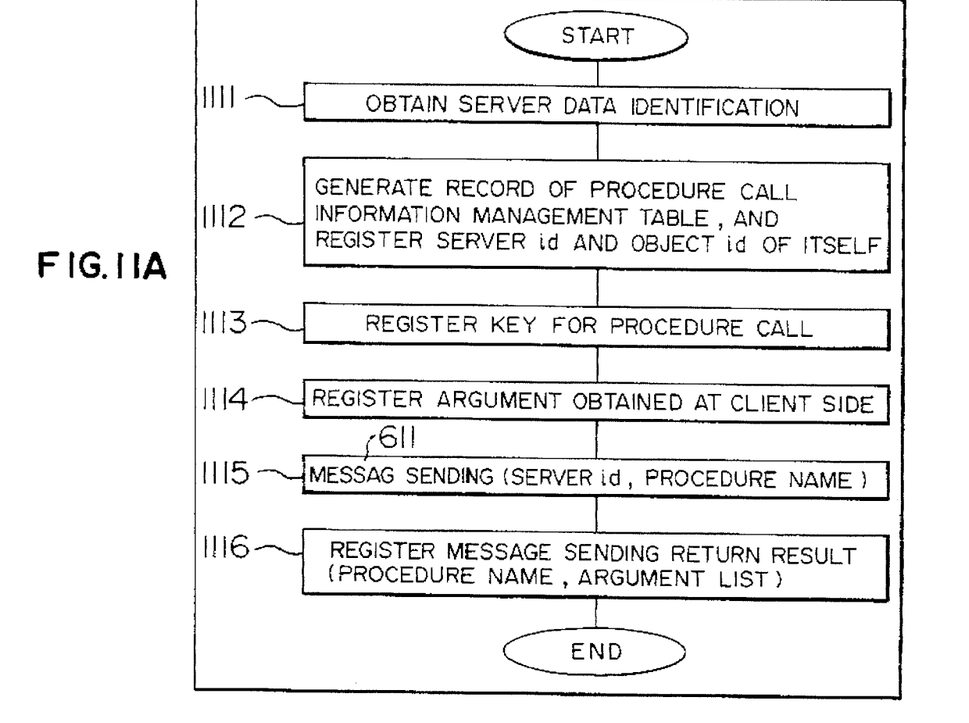
FIGS. 11A and 11B are flow charts showing the details of the process sequence at a client.
Figure 11B:
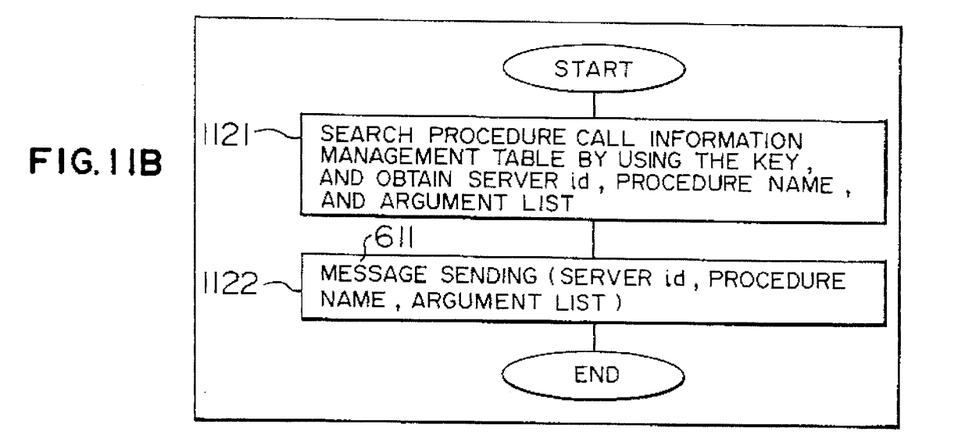
Figure 12:
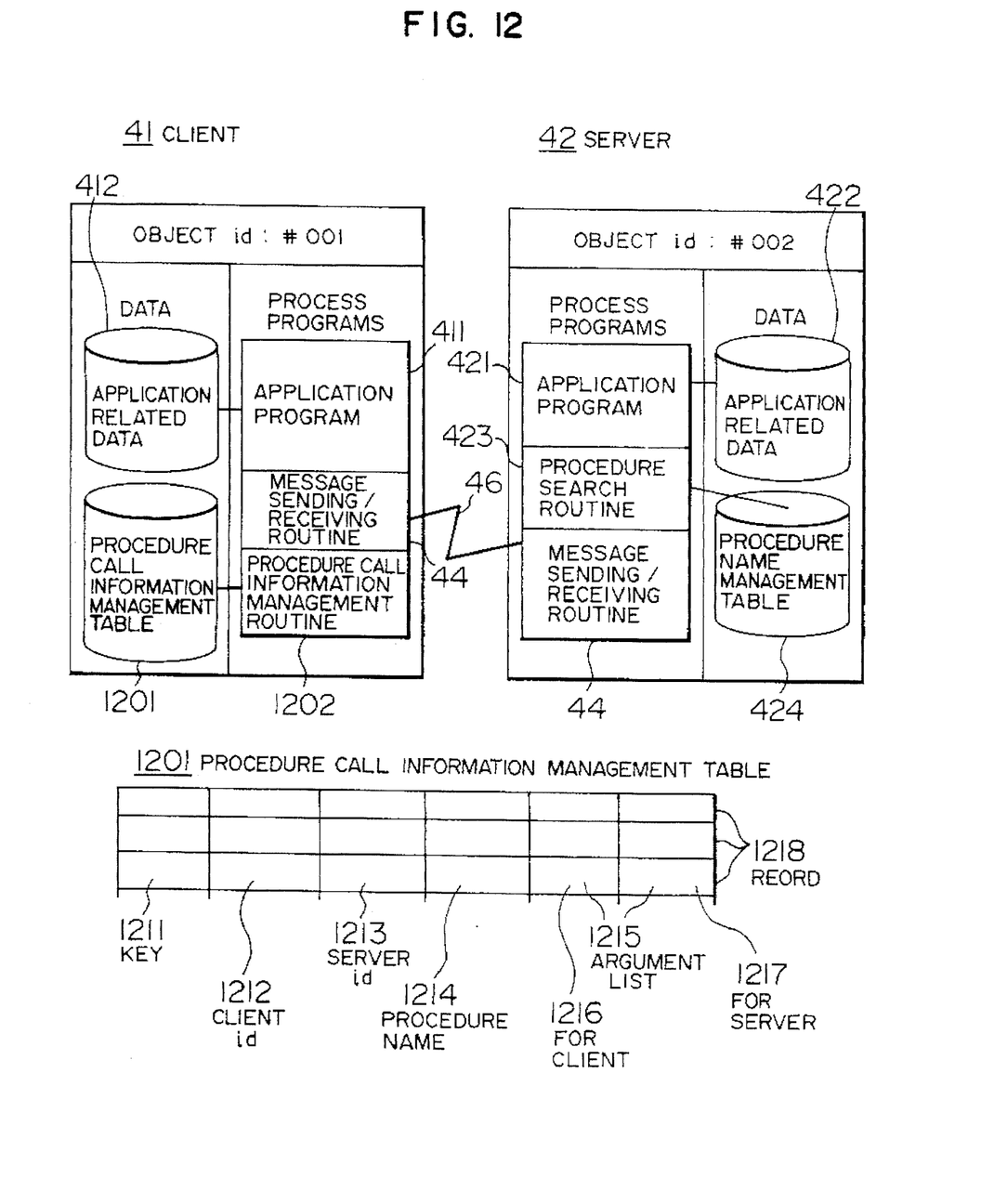
FIG. 12 shows an example of the software configuration of a system in which an operation is performed while calling a procedure from one application program to another application program.

FIG. 10 is a flow chart illustrating the process sequence of notifying the client of a new procedure call method (procedure name and argument list) of the server. FIGS. 11A and 11B are flow charts illustrating the details of a process sequence to be executed by the client. FIG. 12 shows an example of the software configuration of the fourth embodiment.

FIG. 11A is a flow chart illustrating a process sequence of requesting a procedure call method from the server, and FIG. 11B is a flow chart illustrating a process sequence of calling the procedure whose call method was requested to the server. The process sequence to be executed by the server is the same as shown in FIG. 2A.

The configuration of the server 42 shown in FIG. 12 is the same as the server shown in FIG. 4. The client 41 has a procedure call information management routine 1202 in place of the link operation routine 45 shown in FIG. 4, and a procedure call information management table 1201 in place of the link name management table 413 shown in FIG. 4. The procedure call information management table 1201 has a plurality row of records 1218 each having a key 1211, client identifier 1212, server identifier 1213, procedure name 1214, and argument list 1215.

Next, the process sequence of calling a server procedure from the client by using the procedure call information management table 1201 stored at the client, will be detailed with reference to FIGS. 2, 10, 11A, 11B, and 12.

First, the client obtains the server identifier (Step 1111) to generate a record 1218 in the procedure call information management table 1201, and registers the server identifier 1213 and client identifier 1212 in the record 1218 (Step 1112). Next, the client registers a key 1211 to be used for calling the procedure in the record 1218 (Step 1113), registers client side arguments in a client side argument list field 1216 (Step 1114), and sends a message to the server 42 (Step 1115). The server receives the message 42 (Step 214), searches the procedure from the procedure call information management table 1201 (Step 215), and executes the procedure (refer to FIG. 10). Specifically, the server obtains the server side argument list (Step 101) and performs the message return function (Step 217) using as the return result the procedure name and argument list (Steps 102 and 216). The client registers the returned result in the record 1218 of the procedure call information management table 1201 at its procedure name field 1214 and its server side argument list field 1217 (Step 1116).

In executing the procedure, the client first searches the procedure call information management table 1201 by using the key to obtain the server identifier 1213, procedure name 1214, and argument list 1215 (Step 1121), and thereafter sends them to the server in the form of message (Step 1122). The server receives this message (Step 214), executes the procedure identified by the message (Steps 215 and 216), and returns the execution results to the client in the form of message (Step 217).

As described so far, according to the present invention, it is not necessary to enter the procedure name and argument list specific to a server into a client application program. The procedure name and argument list can be dynamically designated while executing the application program, and various procedures supplied by a server can be used and executed. Furthermore, any change at the server can be dealt with without changing the client application program.

What is claimed is:

1. A method for calling procedures located within other objects by using a computer having a storage unit and allowing a first object having an application program and data to call a procedure of another application program of a second object, the method comprising the steps of:

a) said first object (i) storing first information in said storage unit, said first information to be used for instructing said second object to call said procedure and including a procedure name and an actual argument value, and (ii) detecting from said storage unit an identifier corresponding to a storage area of said first information;

b) said second object storing second information to the storage area of said storage unit corresponding to said identifier based on said first information, said second information to be used for calling said procedure and including data to execute said procedure, said data including a predetermined actual argument value;

c) said first object (i) detecting said second information from said storage unit based on said identifier, and (ii) calling said procedure based on said detected second information; and d) said second object executing said called procedure.

2. A method for calling procedures located within other objects according to claim 1, wherein said first information includes a first object identifier for said first object, a second object identifier for said second object, an abstract name of said procedure, and at least one argument necessary for executing said procedure.

3. A method for calling procedures located within other objects according to claim 1, wherein said second information includes a pointer to said procedure, and actual argument values necessary for executing said procedure.

4. A method for calling procedures located within other objects according to claim 1, wherein said first information includes a command for executing said procedure, and an argument of said command.

5. A method for calling procedures located within other objects according to claim 4, wherein said argument includes a data identifier for data to be processed by said procedure, a procedure identifier for said procedure to be executed by said command, and an argument value list necessary for said procedure.

6. A method for calling procedures located within other objects according to claim 1 wherein said identifier is a link identifier used for forming a link between the first object and the second object and said storage area in said storage unit is a link management table.

7. A method for calling procedures located within other objects according to claim 6 wherein said link management table stores procedure names, argument types and argument values as the information which allows the procedure call.

8. A method for calling procedures located within other objects by using a computer having a storage unit and allowing a first object having an application program and data to call a procedure of another application program of a second object, the method comprising the steps of:

a) said first object sending first information to a third object for managing information stored in said storage unit, said first information to be used for instructing said second object to call said procedure and including a procedure name and an actual argument value;

b) said third object storing said first information to said storage unit, detecting from said storage unit an identifier corresponding to a storage area of said first information, and sending said identifier to said first object;

c) said third object receiving second information from said second object and storing said second information to the storage area of said storage unit corresponding to said identifier based on said first information, said second information to be used for calling said procedure;

d) said first object instructing said third object to detect said second information from said storage unit based on said identifier, and said first object calling said procedure based on said detected second information; and e) said second object executing said called procedure.

9. A method for calling procedures located within other objects according to claim 8, wherein said first information includes a first identifier for said first object, a second identifier for said second object, an abstract name of said procedure, and at least one of arguments necessary for executing said procedure.

10. A method for calling procedures located within other objects according to claim 8, wherein said second information includes a pointer to said procedure, and actual argument values necessary for executing said procedure.

11. In a computer system having a storage unit, a method of calling procedures located within other objects by using a client object having an application program and data to call a procedure of another application program of a server object, the method comprising the steps of:

storing, during system setup, link identifiers in the client object;

storing, during system setup, procedure names and corresponding unique procedure pointers in the server object;

storing, during system setup, in a link management table link management records including said link identifiers;

establishing, by the computer system, a link between the client object and server object by using a particular link management record in the link management table;

sending a message, by the client object, to the server object requesting the server object supply a procedure call syntax and arguments to the link management record;

receiving, by the server object, a message from the client object;

writing, by the server object, the procedure call syntax and arguments in the link management record;

detecting, by the client object, the link management record supplied with the procedure call syntax;

calling, by the client object, the procedure by using the procedure call syntax; and executing, by the server object, the procedure.

12. A method according to claim 11 wherein the step of sending the message includes sending the message directly to the server object.

13. A method according to claim 11 wherein the step of sending the message includes, sending the message to the link management table, and sending the message from the link management table to the server object.

14. A method according to claim 11 further including, changing at least one of a procedure and an argument for a procedure call of the server object or adding a new server application program of the server object and maintaining the operation of the client object as it existed prior to the changing or adding.

15. A method according to claim 11 wherein the link management record further includes a client object identifier, a server object identifier, the procedure name, object arguments and server arguments.

* * * * *